(12) United States Patent
Augst (10) Patent No.: US 9,760,782 B2
(45) Date of Patent: Sep. 12, 2017

(54) METHOD FOR REPRESENTING OBJECTS SURROUNDING A VEHICLE ON THE DISPLAY OF A DISPLAY DEVICE

(75) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 737 days.

(21) Appl. No.: 13/287,675

(22) Filed: Nov. 2, 2011

(65) Prior Publication Data

US 2012/0062372 A1 Mar. 15, 2012

Related U.S. Application Data

(63) Continuation of application No. PCT/EP2010/002330, filed on Apr. 16, 2010.

(30) Foreign Application Priority Data

May 7, 2009 (DE) .......... 10 2009 020 328

(51) Int. Cl.
*B60Q 1/00* (2006.01)
*G06K 9/00* (2006.01)
(Continued)

(52) U.S. Cl.
CPC ..... *G06K 9/00805* (2013.01); *G06K 9/00798* (2013.01); *G08G 1/165* (2013.01); *G08G 1/166* (2013.01); *G01S 13/931* (2013.01)

(58) Field of Classification Search
CPC ..................................................... B60Q 1/00
(Continued)

(56) References Cited

U.S. PATENT DOCUMENTS 6,476,855 B1 11/2002 Yamamoto
6,759,949 B2 * 7/2004 Miyahara ...................... 340/435
(Continued)

FOREIGN PATENT DOCUMENTS

DE 199 23 964 A1 12/1999
DE 199 40 723 A1 3/2001
(Continued)

OTHER PUBLICATIONS

Kohsia S. Huang et al., "Driver's View and Vehicle Surround Estimation using Omnidirectional Video Stream", Intelligent Vehicles Symposium 2003 Proceedings, IEEE, Jun. 9-11, 2003, pp. 444-449, Piscataway, NJ, USA. XP010645918.
(Continued)

*Primary Examiner* — Brent Swarthout
(74) *Attorney, Agent, or Firm* — Crowell & Moring LLP (57) ABSTRACT

A method represents objects of varying visibility surrounding a vehicle for a driver on a display device. The surroundings are automatically recognized by object recognition devices. For recognized objects, it is determined whether the respective object is a first object classified to be visible, or a second object classified to be invisible to the occupant. For a number of recognized objects including at least one first object and second object, respective positions of the objects are determined for the display, in the case of which the geometrical relationships between the number of objects correspond essentially to the real geometrical relationships.

29 Claims, 5 Drawing Sheets

(51) Int. Cl.
*G08G 1/16* (2006.01)
*G01S 13/93* (2006.01)

(58) Field of Classification Search
USPC ............... 340/903, 937, 435; 348/148, 149; 701/301
See application file for complete search history.

(56) References Cited

U.S. PATENT DOCUMENTS

| | | |
|---|---|---|
| 6,947,064 B1 | 9/2005 | Hahn et al. |
| 8,547,298 B2* | 10/2013 | Szczerba et al. .................. 345/7 |
| 2003/0218676 A1* | 11/2003 | Miyahara ...................... 348/148 |
| 2006/0164219 A1* | 7/2006 | Knoll ............................ 340/435 |
| 2007/0053551 A1 | 3/2007 | Kubo et al. |
| 2008/0049150 A1 | 2/2008 | Herbin et al. |
| 2008/0316011 A1 | 12/2008 | Kirsch et al. |
| 2009/0059005 A1 | 3/2009 | Hattori et al. |
| 2009/0273674 A1 | 11/2009 | Russ et al. |
| 2010/0045482 A1* | 2/2010 | Strauss ......................... 340/903 |

FOREIGN PATENT DOCUMENTS

| | | |
|---|---|---|
| DE | 10 2005 020 772 A1 | 11/2006 |
| DE | 10 2005 062 151 A1 | 7/2007 |
| DE | 10 2006 052 779 A1 | 5/2008 |
| DE | 10 2007 014 531 A1 | 10/2008 |
| DE | 10 2008 051 593 A1 | 4/2010 |
| EP | 0 686 865 A1 | 12/1995 |
| EP | 1 647 807 A1 | 4/2006 |
| EP | 1 768 097 A1 | 3/2007 |
| EP | 1 892 688 A1 | 2/2008 |
| FR | 2149813 | 3/1973 |
| GB | 1 346 145 | 2/1974 |
| JP | 2003-87781 A | 3/2003 |

OTHER PUBLICATIONS

Paul Viola et al., "Rapid Object Detection using a Booster Cascade of Simple Features", Proceedings 2001 IEEE Conference on Computer Vision and Pattern Recognition, CVPR 2001, Kauai, Hawaii, Dec. 8-14, 2001, pp. 511-518, vol. 1. XP010583787.
German Search Report dated Jul. 17, 2009 including partial English-language translation (Nine (9) pages).
International Search Report dated Aug. 11, 2010 including English-language translation (Ten (10) pages).

* cited by examiner

METHOD FOR REPRESENTING OBJECTS SURROUNDING A VEHICLE ON THE DISPLAY OF A DISPLAY DEVICE

CROSS-REFERENCE TO RELATED APPLICATIONS

This application is a continuation of PCT International Application No. PCT/EP2010/002330, filed Apr. 16, 2010, which claims priority under 35 U.S.C. §119 from German Patent Application No. DE 10 2009 020 328.1, filed May 7, 2009, the entire disclosures of which are herein expressly incorporated by reference.

BACKGROUND AND SUMMARY OF THE INVENTION

The invention relates to a method and a device for representing objects of varying visibility surrounding a vehicle on the display of a display device.

From the state of the art, night vision systems are known where a picture of the surroundings of the vehicle is taken by a remote infrared camera and displayed on a display in the vehicle interior. As a result, obstacles or objects become visible which, in darkness, cannot be seen by the human eye. Object recognition systems are also known which carry out an automatic object recognition based on surroundings detected in the infrared spectrum. Thus, objects can also be automatically recognized which radiate or reflect no light or only little light in the visible spectrum but have a temperature that differs from their surroundings. It is also known that an automatic recognition of an object of a certain class in the surroundings of the vehicle can be emitted as a driver warning, for example, a pictogram, on a display in the interior of the vehicle. When, by use of a night vision system, for example, a pedestrian is recognized, a symbolic warning pictogram that corresponds to a pedestrian, will appear on the display. The obstacles recognized by the night vision system may also be highlighted directly in the picture of the night vision system on the display, for example, by way of a bordering or coloration of the obstacle.

German Patent document DE 10 2005 020 772 A1 describes a display system for representing the surroundings of a motor vehicle, the vehicle surroundings being detected by a remote infrared camera. In this case, detected objects that are classified as dangerous to the vehicle are represented in a highlighted manner in a head-up display of the motor vehicle.

In European Patent document EP 1 647 807 A1, a driver assistance system is described in the case of which, for the purpose of a driving assistance, a virtual vehicle driving ahead is shown to the driver in a display, such as a head-up display and, as a function of the detected driving situation, the driver is given driving instructions on the display.

German Patent document DE 10 2005 062 151 A1 describes a method and a device for assisting a vehicle driver when passing through narrow sections of the driving route. By use of at least one camera, image data are acquired of the traffic surroundings of the vehicle and, based on the dimensions of the vehicle, a representation of the future positions of the vehicle is generated, on which the image data of the camera are superimposed. The driver can recognize from the representation whether his vehicle can pass through a narrowing of the driving route situated in front of his vehicle.

From the state of the art, various systems for the recognition of road marks by use of devices installed in a vehicle are also known.

Furthermore, object recognition systems for recognizing obstacles on the road are known from the state of the art. In particular, a fusion of a 3D TOF sensor (TOF=Time of Flight) and a monocular camera is known from the "MID-IAS" Public Research Project. By means of the TOF sensor, objects are measured based on the transit times of the light that is emitted, reflected by the objects and subsequently received. The distances from the objects are thereby determined for different solid angles. A 3D map of the scene is created therefrom. In the case of the above-mentioned sensor fusion, the sensor data are executed by the TOF sensor and by the monocular camera by way of the same solid angles. The advantages of both sensor types can be combined in this case. In particular, the advantage of the high angular resolution of a monocular camera, which, however, supplies only minimal information concerning the object distance, is combined with the depth information of the 3D sensor determined concerning the same objects, which 3D sensor has an angular resolution that is relatively low per se.

Figure 1:
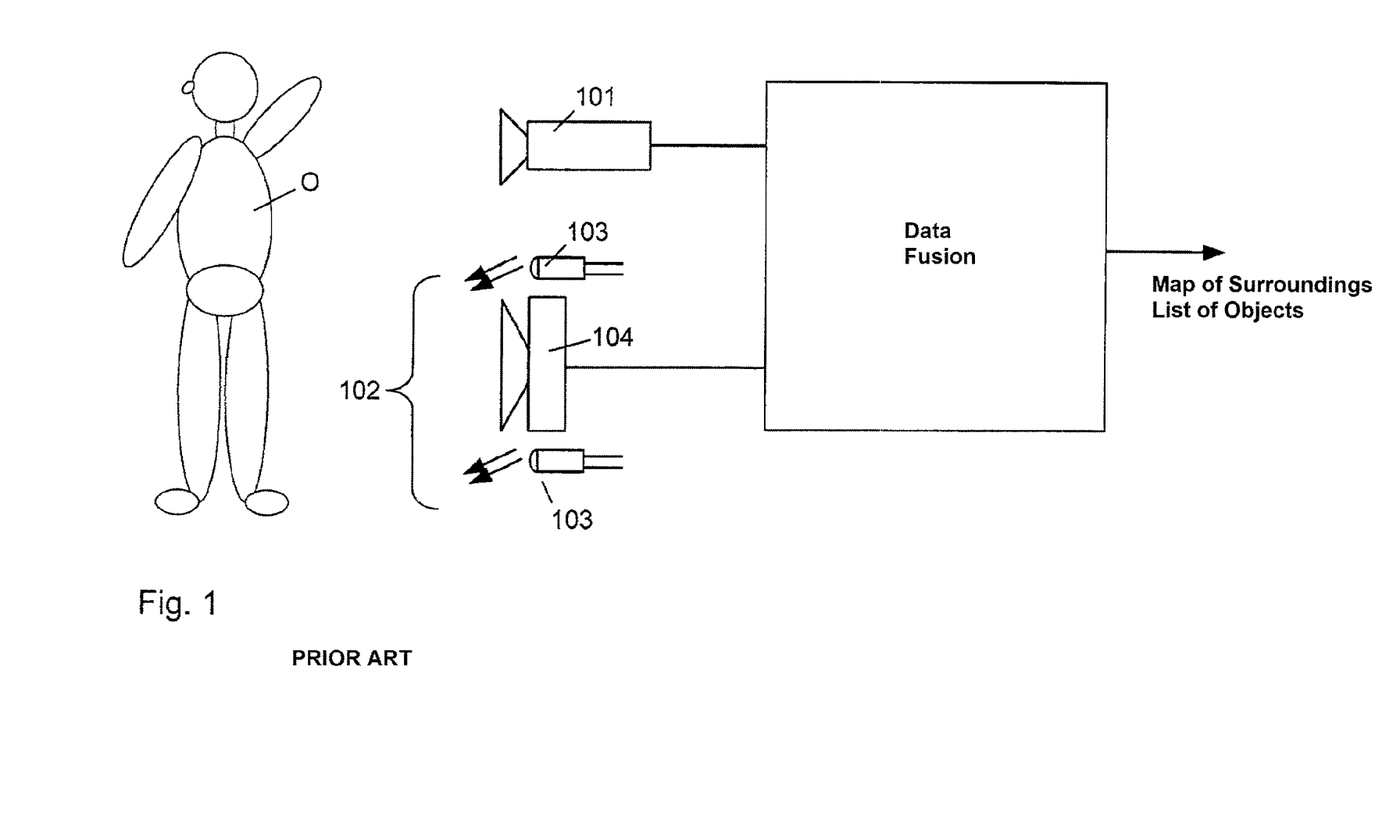
FIG. 1 is a schematic representation of the camera system according to MIDIAS known from the state of the art.

FIG. 1 is a schematic view of the construction of a camera system based on sensor fusion. An object O to be recognized, which, for example, is represented as a person, is detected here by a monocular camera 101 as well as by a corresponding TOF sensor 102. In this case, the TOF sensor 102 contains corresponding means 103 for emitting infrared radiation as well as means for receiving the infrared radiation reflected at corresponding objects. The data of the camera and the sensor will then be merged, i.e., "fused", and, for example, a map of the surroundings or a list of the recognized objects will be determined on this basis.

Known object recognition systems often generate a large number of warnings and other information to be observed by the user. Camera images, which show comprehensive parts of the surroundings may inundate the driver with information. In this case, it is difficult for an occupant of the vehicle to perceive a partly very large quantity of information and particularly to relate the instructions and warnings to the actual or real surroundings. Furthermore, by use of known systems, often a very large number of recognized objects are represented, whereby the perception of the occupant, and particularly of the driver, of the vehicle is overloaded.

Figure 2:
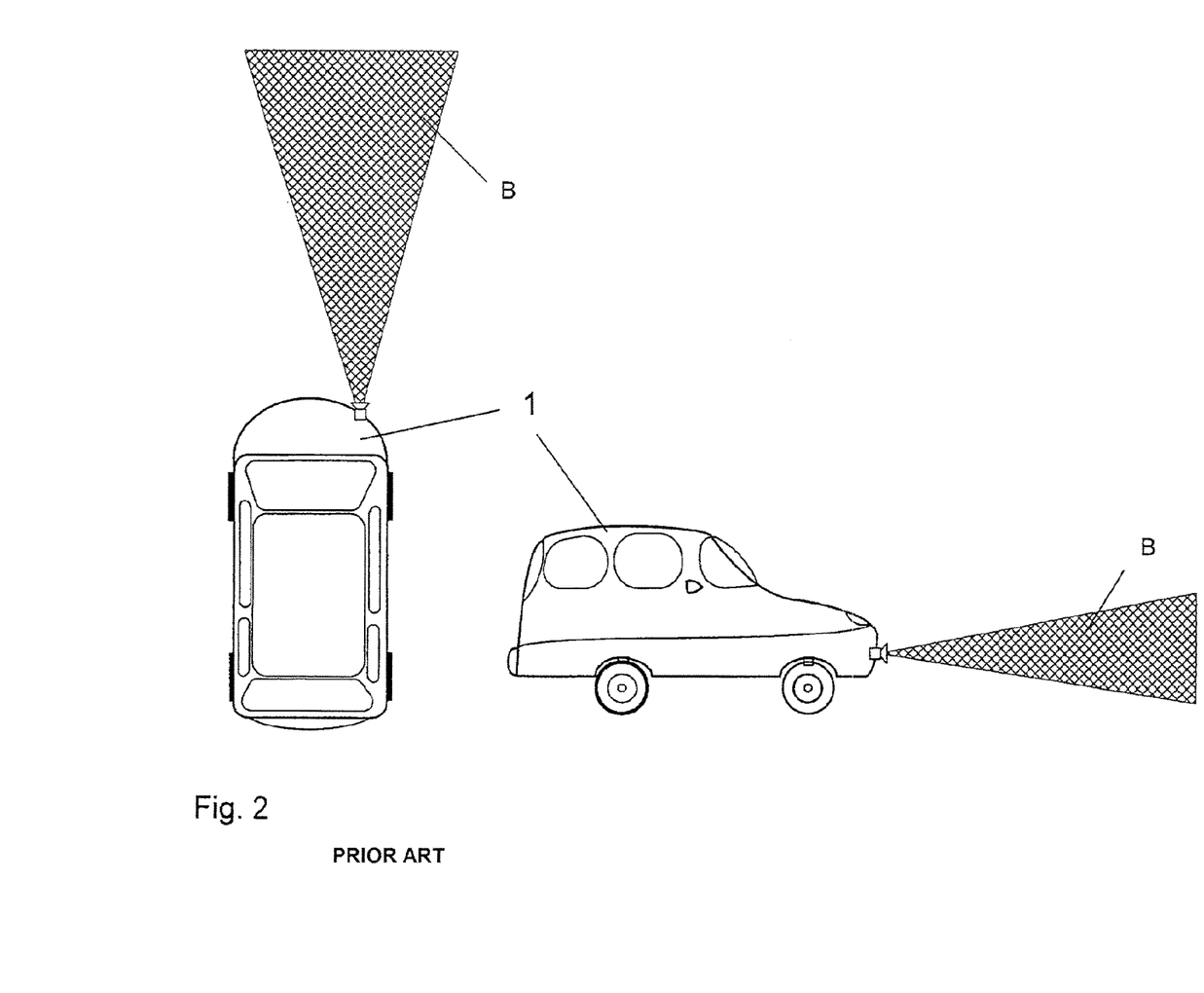
FIG. 2 is a schematic representation of a vehicle with an object-recognizing camera installed therein.

When detecting the surroundings by using a night vision system, for example, based on a thermal camera in the wavelength range of 8-10 μm, the surroundings, including any obstacles, for example, pedestrians and animals, are represented on a display in the vehicle interior. In particular, warm objects (pedestrians, animals, certain parts of other vehicles) become very clearly visible. It is nevertheless usually very difficult for the driver to correlate the objects represented on the display with the real surroundings seen through the windshield glass. In particular, it is very difficult to recognize the spatial relationship between objects visible to the driver and objects shown on the display, which were recognized by the night vision system but cannot be seen by the driver's vision system. In addition, the image detected by a night vision system images only a certain aperture angle, which cannot always correspond to the variable human field of perception. It is therefore difficult for the driver to maintain an overview as to which area of the road is currently visible on the display in the vehicle interior, in order to thereby correlate the recognized obstacles to the real surroundings. FIG. 2 explains the just discussed problems again. This figure represents a top view as well as a lateral view of a vehicle 1, the aperture angle of a remote infrared camera of a night vision system in the forward region of the vehicle 1 being represented by a corresponding hatched region B. It is shown that the aperture angle differs clearly from the driver's field of vision. However, the installation of a remote infrared camera inside the vehicle occupant compartment is not possible because the windshield glass of the vehicle dampens the thermal radiation.

As explained above, a representation of the entire surroundings of the vehicle as a video image or as a large number of symbols, for example, on the head-up display, also requires high technical expenditures and is disadvantageous for human perception. Thus a conceivable representation of all objects recognizable by several types of sensors by use of one or more display devices would result in a representation that overloads human perception and is difficult to interpret.

It is therefore an object of the invention to create a representation of the surroundings of a vehicle for a user from the perspective of an occupant of the vehicle on a display device by which the user can better detect the objects in the surroundings of the vehicle.

This and other objects are achieved by a method and device for representing for a user objects of varying visibility surrounding a vehicle from the perspective of an occupant, particularly the driver of the vehicle, on the display of a display device. The surroundings of the vehicle are at least partially automatically recognized by one or more object recognition devices. For objects recognized by the object recognition device or devices, based on one or more criteria, it is determined whether the respective object is a first object that was classified to be visible to the occupant, or a second object that was classified to be invisible to the occupant. For a number of recognized objects including at least one first object and at least one second object, the respective positions of the objects are determined for the display, in the case of which the geometrical relationships between the number of objects correspond essentially to the real geometrical relationships from the perspective of the occupant of the vehicle. The number of objects are represented in the determined positions on the display.

The method according to the invention is used for representing objects of varying visibility surrounding a vehicle for a user from the perspective of an occupant, particularly the driver of the vehicle, on the display of a display device, wherein the surroundings of the vehicle are at least partially automatically recognized by use of one or more object recognition devices.

The term "vehicle" can apply particularly to a motor vehicle, an aircraft, a watercraft or an amphibious vehicle. In addition, a vehicle in the sense of the invention may also be an autonomous utility or roving vehicle and/or a mobile robot. In particular, the vehicle can carry out at least partially automatic maneuvers, for example, park-in maneuvers.

In a preferred variant, the user of the vehicle corresponds to the occupant of the vehicle itself. In this variant, the term "user" used in the following can be equaled with the occupant of the vehicle, the occupant being especially the driver of the vehicle. However, if required, there is also the possibility that the user of the vehicle is a person who controls the vehicle from the outside, for example, in a wireless manner, and/or receives information from the vehicle in a wireless manner. In this sense, the user of the vehicle may, for example, be a second driver of the vehicle who monitors the implementation of a maneuver. In this case, if required, there may be no occupant at all in the vehicle. Correspondingly, the perspective of the occupant will then be the perspective of a virtual occupant in a position in the vehicle interior. If the user is not identical with the occupant of the vehicle, the user, as required, can select the position of the occupant from a number of positions. The assumed position of the virtual occupant may be a position that is selected or defined by the user and which is within the geometrical boundaries of the vehicle, particularly within its interior.

According to the invention, the method determines for objects which were recognized by the object recognition device or devices, based on one or more criteria, whether the respective object is a first object that was classified to be visible to the occupant, or a second object that was classified to be invisible to the occupant. When the user is not the occupant, the visibility classification takes place based on a virtual occupant assumed to be in the corresponding occupant position. For a number of recognized objects comprising at least one first object and at least one second object, the respective positions of the objects are determined for the display, wherein, for the respective positions, the geometrical relationships between the number of objects correspond essentially to the real geometrical relationships from the perspective of the occupant of the vehicle. In particular, the relative geometrical relationships between at least a total of three represented objects correspond essentially to the real geometrical relationships between the corresponding objects in the surroundings of the vehicle from the occupant's perspective.

In this case, for example, the distance relationships between the positions of the objects on the representation can correspond to the distance relationships between the corresponding objects on the road, as the occupant would see these from his perspective, especially his eye position. The number of objects will then be represented on the display in the determined positions.

An object recognition device in the sense of the invention may especially be a device that is known per se and permits at least the recognition of characteristics, particularly of edges and/or contours, of an object and/or their mutual arrangement. A classification of the objects, for example, into a class of objects, is not absolutely necessary.

According to the invention, by the representation of at least one first visible object and one second invisible object, the user of the vehicle learns the relative position of these objects in correspondence with the real geometrical circumstances for the occupant's perspective, so that the user of the vehicle obtains a clear idea of the actual position of the invisible objects relative to the visible objects.

The invention therefore provides a determination of such a respective representation position of the displayed first and second objects respectively, which essentially corresponds to the relationship of these positions from the position of an occupant, particularly from his viewing angle. Thus, objects which were detected from a different perspective, for example, from an installation position of the object recognition device in the vehicle, are represented on the display of the display device in the geometrical relationships that are correct for the occupant's position.

In a preferred embodiment, the positions of the first and second objects respectively are first determined relative to the vehicle, and are subsequently transformed to the representation on the display of the display device by a geometrical transformation. In this case, geometrical relationships especially are the proportions of distances between the displayed first and second objects respectively and/or the angular relationships between these objects. The detection and recognition of corresponding first and second objects respectively takes place, for example, by use of different object recognition devices provided at the vehicle. These object recognition devices may, for example, be further developed as a close infrared or a remote infrared, for example, thermal imaging camera, or as devices that are based on a distance measurement to the different parts of the surroundings. Likewise, the object recognition devices may also be cameras for visible spectral fractions of the light.

According to the invention, the term "object" also applies to a part of the surroundings, for example, a part of the road having a road marking or road boundary or a part of a building. Invisible objects especially are those objects which, for example, because of their low reflectance in the spectrum visible to humans and/or because of the light and/or vision relationships for the occupants of the vehicle or, for example, because of the coloration of the object, are not visible or may most probably not be visible. In particular, invisible objects are those objects which, despite a viewing direction that would allow their perception per se, will most probably be overlooked.

In a particularly preferred embodiment of the invention, the classification of objects as first visible objects and second invisible objects takes place on the basis of a visibility proportion. In this case, based on the criterion or criteria, an object is classified as a first object if, with respect to the object, a first threshold of a visibility proportion is exceeded for the occupant of the vehicle. An object is classified as a second object if, with respect to the object, there is a falling below a second threshold of a visibility proportion for the occupant of the vehicle. The second threshold corresponds to the first threshold or is lower than the first threshold. As a result of the corresponding spaced selection of the first and second thresholds, in particular, an advantage is achieved in that the generated display still offers a good orientation to the occupant but is not cluttered with unnecessarily displayed objects or parts of the surroundings.

The visibility proportion of an object, in particular, can be determined as a function of the spectral characteristics of the light emitted by it. Thus, for example, objects having an unambiguously recognizable radiation in the remote infrared spectrum may not have sufficient radiation in the visible spectrum and vice-versa.

The classification of recognized objects into visible and invisible objects may especially take place based on the determination of a visibility proportion, as disclosed in BMW's earlier German patent application 10 2008 051 593.0, the entire content of which is hereby incorporated by reference. The principles of the method described in this earlier patent application may also be used in the invention described here for identifying a visible and invisible object respectively. However, in contrast to the earlier patent application, in the invention described here, the visibility of the recognized objects is determined from the position of the occupant, particularly of the driver of the vehicle. In contrast, in the earlier patent application, the visibility of the vehicle itself is determined from different solid angles or observation positions.

As mentioned above, for the differentiation between "visible" and "invisible", particularly a suitable threshold is defined for the determined visibility proportion, in which case, when the threshold is exceeded, the object is classified as visible to the person, and when there is a falling below the threshold, the object is classified as invisible to the person. The visibility proportion can be expressed, for example, in the form of the probability with which the recognized object is seen or overlooked particularly by a statistical, human or animal vision system. Analogous to the above-mentioned earlier patent application, for determining the visibility proportion, a first light distribution comprising a brightness distribution and/or spectral distribution of luminous surfaces of the respective recognized objects and, if applicable, in the surroundings of the detected objects, can be determined. This brightness distribution and/or spectral distribution is determined especially by use of corresponding sensing devices in the vehicle, in which case these sensing devices may also be part of the object recognition device or devices used according to the invention. For defining a suitable visibility proportion for the position of the occupant or driver of the vehicle, the first light distribution is preferably transformed into the perspective of the position of the occupant or driver of the vehicle, whereby a second light distribution is obtained. Based on this second light distribution, a visibility proportion can then be defined for the respective object.

The term "luminous surface" may be applied to a luminescent surface as well as to a reflective, refractive or fluorescent surface. A luminous surface may also be a surface that shines itself, as well as, a surface that can also reflect or refract the light, such as the windshield of a vehicle. A luminous surface may also be a vehicle light. The classification into luminous surfaces may, for example, be made according to geometrical aspects. Thus, for example, objects which are situated close together, or their parts, may form a luminous surface, while an object arranged farther away or a part thereof may be classified as another luminous surface. In this case, it is particularly advantageous to consider a source quantity of the first light distribution with similar characteristics a luminous surface and/or to process it has such. The luminous surfaces may possibly also be very small infinitesimal surfaces. The luminous surfaces may have arbitrary shapes; they may, in particular, also be curved.

By way of the first light distribution, a spatial distribution of the luminous surfaces is therefore described. The light distribution may be determined and/or processed as an angle, spatial angle or angular relationship between the luminous surfaces.

The above-mentioned visibility proportion represents especially the perceptibility of the object, its outer boundaries, and/or the spatial alignment of the object for the person's visual system. Furthermore, the visibility proportion can also take into account the distinguishability of the respective object from different or additional objects. In particular, an object is assumed to be visible when a sufficiently large fraction of its parts, which may also be objects, especially of edges and/or structures, are visible, and/or when parts of the object are visible at its spatial boundaries. An object will be assumed to be invisible in its entirety, particularly when these criteria have not been met.

The determined visibility proportion is a function of variables, especially of current contrast relationships as well as of the relative movement of the respective object with respect to customary light sources or other objects. Thus, for example, the probability that an object is seen by the occupant generally increases when—viewed from the occupant's position—the object is moving relative to the background.

In a preferred variant of the method for determining the visibility, the determined first light distribution is present in such a form that it contains an angular dependence of the parameters of the light distribution. This can be described, for example, in the form of a function of the dependence of the individual parameters of the light distribution on the direction and, if applicable, also on the distance, which function is described by supporting points. The first light distribution is advantageously present in a vector-based format, a vector in this format indicating the direction in which the corresponding luminous surface is situated and, as an attribute, containing the pertaining light parameters and/or the corresponding radiation characteristics of the respective luminous surface.

The transformation of the first light distribution carried out for determining the visibility proportion is preferably carried out based on a transformation of coordinates, which transforms the position and/or the ray angles of the luminous surfaces into the perspective of the occupant of the vehicle. This transformation of the first light distribution can be carried out, for example, based on a simulation of the light propagation in the system from the respective recognized object and at least parts of the surroundings of the object. In a computer-assisted manner, a model of the luminous surfaces with their radiation characteristics is spatially established from the determined first light distribution, and this model can then, again in a computer-assisted manner, be transformed by use of known transformations into the perspective of the occupant of the vehicle.

In a preferred embodiment of the method for determining the visibility proportion, one or more contrast relationships between luminous surfaces, particularly between the respective recognized object and the surroundings of the recognized object, within the second light distribution are determined. The visibility proportion is a function of the contrast relationship or relationships. In this case, the contrast relationship is a measurement for the difference between the brightness and/or spectral distributions of different luminous surfaces and/or within a luminous surface. The difference can, for example, also be expressed in the form of a gradient.

As required, the contrast relationship may also be determined by way of a function which describes the respective spatial courses of the brightness or spectral distribution of the individual luminous surfaces, as required, depending on the solid angle of the position of the occupant of the vehicle or the distance from the position of the occupant of the vehicle. The contrast relationship may therefore also represent the difference between the mean brightnesses or mean spectral distributions of two luminous surfaces. The mean of the brightness or spectral distribution is taken by way of the dimension of the respective luminous surface. In particular, a contrast relationship between the respective recognized object and the surroundings of the object is determined as the contrast relationship. In particular, the contrast relationship can be determined between the luminous surfaces of the respective object, which characterize the geometrical borders or the dimensions of the object, and the luminous surfaces of the surroundings, particularly the luminous surfaces not hidden by the respective object. The determination of the contrast relationship between the luminous surfaces, which with respect to the position of the occupant of the vehicle form the geometrical borders of the respective object, and the luminous surfaces from the surroundings, which are visible in an essentially adjacent solid angle with respect to the geometrical borders of the recognized object, is particularly advantageous. The visibility proportion can, in addition, also be determined from local contrast relationships of partial areas within the second light distribution.

According to the invention, the differentiation between the first visible and second invisible objects preferably takes place by use of the object recognition device or devices which, in the method according to the invention, are used for the detection or recognition of objects in the surroundings of the vehicle. The invention can therefore be implemented in a particularly cost-effective manner by using sensors or computing resources that are present anyhow. For example, the automatic differentiation between the first and second objects and/or the selection of the first and second objects to be represented together with further methods, for example, for the recognition of objects, can be implemented in the computing unit of an object recognition system, particularly by the characteristics of objects already present in this system and determined within the scope of the object recognition method.

In a preferred embodiment of the method according to the invention, the differentiation between the first visible and the second invisible objects takes place by use of at least two type of sensors and/or object recognition devices. For example, the surroundings of the vehicle can be detected by use of a close or remote infrared image sensor for the detection of objects which cannot be visible to the occupant, for example, at night. The objects which may be visible to the occupant can be detected by use of an image sensor in the visible spectrum or a corresponding camera. For objects which are detected by such an image sensor, a checking of the visibility proportion can take place according to the above-mentioned principles. By an automatic comparison of detected objects that were detected by way of at least two types of sensors, it can be determined which objects situated in the surroundings of the vehicle are visible or invisible to the driver under the given light and vision conditions. Advantageously, laser scanners, laser distance sensors or TOF sensors can be used as the sensor type. In this case, it is particularly advantageous that these sensors do not depend on the radiation or reflection of the surrounding light. Two types of sensors may, for example, also be used together in a sensor housing or on a semiconductor crystal, for example, as pixels with a different spectral sensitivity, for example, for the visible spectrum and the remote infrared spectrum.

In a further embodiment of the method according to the invention, in which the user corresponds to the occupant, the viewing direction of the occupant of the vehicle is detected, in which case, for the definition of the criterion or criteria, those objects are classified as second objects which, on the basis of the detected viewing direction, particularly of the history of the viewing direction, may most probably be overlooked by the occupants. The occupant's viewing direction can be detected by arbitrary eye tracking methods which are known from the state of the art and which track the course of the person's eye movement. Conclusions can be drawn therefrom concerning the objects which are more or less easily visible to the driver.

In addition to the analysis of the basic viewing direction, the invention also takes into account so-called saccadic eye movements, which are sufficiently known to a person familiar with the art. These usually very small and quick eye movements, which take place within one viewing direction, play a role in the case of the actual visibility or invisibility of objects to the person. The taking into account of the viewing direction and the saccadic eye movements also contains the taking into account of the history of these parameters. It can thereby be determined, for example, that an object is a second object if the occupant has looked at this object immediately after observing another section in space with a clearly different illumination and/or distance and the time required for an adaptation or accommodation of the human visual system has not yet elapsed.

In a further development of the method according to the invention, the position of the display of the display device, which can be perceived by the user of the vehicle, is situated outside the vehicle interior. In this case, the representation can be designed, for example, by means of a head-up display or a further development of the latter. As an alternative, the display can take place, for example, by means of a projection, particularly a holographic projection, inside or outside the vehicle interior, or by means of a 3D display.

In a further variant of the method according to the invention, the first and second objects represented on the display can be displayed at least partly as symbols. In particular, the at least partly symbolic representation can be implemented such that different parts of the image detected by a camera device are subjected to different image processing steps. Thus, particularly those parts of the image that contain visible and/or invisible objects or their parts, for example, edges or marginal areas, can be subjected to different image processing operators. A symbolic representation can also be generated by a faded-in graphic or by a graphic faded over the image and/or by a corresponding symbol.

In an additional further development of the method according to the invention, road boundaries and/or road markings recognized by at least one object recognition device, up to a predefined distance from the vehicle, are classified as first objects. Advantageously, the road boundaries and/or road markings at a defined distance from the vehicle, depending on the prevailing conditions (day, night, twilight, rain, fog), can be assumed to be visible and can be displayed in the display according to the invention. In this manner, a classification of the road boundaries and road markings respectively as visible or invisible objects is carried out particularly easily.

In a further embodiment of the method according to the invention, the classification of the objects recognized as first or second objects by the object recognition device or devices takes place as a function of light and/or visibility relationships detected by at least one detection device and/or their history, particularly while taking into account psycho-visual properties of the human vision system. When detecting the light and/or visibility relationships, in particular psycho-visual contrast relationships are taken into account. Psycho-visual contrast relationships and their influencing variables per se are known to a person skilled in the art. A psycho-visual contrast relationship is based on the known specific properties of the person's vision system, that is, on the ability of this system to perceive differences between differently shining parts in space, coloration courses, intensity courses, textures as well as edges of an object, among other things, by means of the spatial and time-related gradients of different light parameters. The psycho-visual contrast relationships preferably additionally include the adaptation properties of a person's vision system.

According to the invention, the determination of the visibility proportion and/or of variables for the determination of the visibility of objects can take place by way of a simulation of the vehicle occupant's visual system. In this case, the surroundings and/or history of the light relationships can be taken into account to which an occupant of the vehicle is exposed and/or was exposed in the recent past. In a preferred variant, the psycho-visual contrast relationship is determined based on a simulation of the visual system of a, for example, statistical driver of the vehicle. In this case, a number of influencing variables or events, which act upon the driver, can be taken into account. These include, for example, the influence of being "blinded" by a traffic participant, the influence of the interior light at night, the reflective effect of the windshield in front of his eyes and the like.

From the total number of first objects, a partial quantity of first objects is advantageously selected which or whose position is/are displayed in the display device. Preferably, a partial quantity of first objects is selected that provides the user with information concerning the position of the at least one second object. In an embodiment of the method according to the invention, the selection of first objects to be represented depends on whether at least one second object in the same area of the surroundings was selected to be displayed. In particular, only those first visible objects are represented on the display, which surround the second invisible objects represented on the display at least from two or three spatial sides. A frame is thereby formed of the first objects, which surrounds the second objects displayed in the representation. The user of the vehicle thereby obtains additional assistance for perceiving the position of the second invisible objects, specifically without an unnecessary constant representation of many objects visible to the driver anyhow. For example, the appearance of an invisible object in the surroundings of the vehicle and in the representation according to the invention has the result that several objects, which are visible per se and previously had not been displayed in the representation, are now represented together with the invisible object.

In another embodiment of the invention, parts, that are visible per se, of an object that is represented in a determined position on the display are not represented, and/or are suppressed in the representation on the display when the visibility proportion of the object falls below the second threshold. In this manner, at least those parts of corresponding second objects are not displayed that are visible per se to the vehicle occupant.

In a further embodiment of the method according to the invention, a virtual level of the road comprising the road boundaries and/or road markings recognized by at least one object recognition device is generated on the display. A representation is thereby generated by which the driver can very rapidly detect the position of recognized objects with respect to the road because the objects are represented in the correct positions relative to the virtual road level. By the representation of the virtual road level, which comprises the recognized road markings and/road boundaries, furthermore, a very good orientation aid is provided for the driver concerning the displayed recognized objects. In particular, the position of an object relative to the road markings or road boundaries can be represented on a relatively small area of the display of the display device, such as a head-up display, in which case the driver can nevertheless estimate precisely at which points of the road, for example, an obstacle is situated. A high-expenditure expansion of the head-up display to large parts of the windshield or the use of a so-called contact-analogous head-up display is therefore not necessary. In particular, the driver very easily recognizes in which lane as well as in which position within the lane a corresponding visible or invisible object is located.

In a further embodiment of the method according to the invention, a selection of the first and second objects displayed on the display takes place as a function of the odometric data of the vehicle and/or of an automatically analyzed traffic situation. For example, the length of a visible road section represented on the display or the width of the road section, as, for example, the number of represented lanes, may depend on the odometric data of the vehicle and/or on the automatically recognized traffic situation.

Depending on the automatically analyzed traffic situation (for example, parking and maneuvering, speed restricted zone, expressways), a respective relevant area is represented on the display. The area to be represented can especially depend on the estimated position or range of the vehicle in the next seconds. This is influenced by the consideration that certain areas of the road, for example, directly adjacent to the vehicle, are not relevant in many traffic situations. In contrast, areas situated farther away will be more relevant. At a maneuvering speed, the road section of a length of a few meters directly adjoining the vehicle will be relevant, whereas, at an expressway speed, the representation starts only after 20 meters and includes the next 30 meters. The road section represented on the display may also be selected as a function of the data of a navigation system, for example, as a function of the further course of the road and/or the set destination.

In a further embodiment of the method according to the invention, the respective positions of the first and second objects for the display are determined by way of depth information concerning the real position of the first and second objects relative to the vehicle. The depth information is determined by use of at least one object recognition device. In this manner, a simple trigonometric context is obtained which can be determined in a resource-saving manner. In this case, the distance to the corresponding object can be determined by methods known per se. The implementation of the method by means of the above-mentioned MIDIAS camera system is particularly advantageous, wherein the depth information of the TOF sensor relative to the concerned solid angle is used for determining the object distance.

In a further embodiment of the invention, for generating a depth effect, the display has several display levels with different positions perceived by the user with respect to a predetermined viewing direction of the user, particularly the driver, of the vehicle. Preferably, parts of the representation, particularly different objects, can be represented on different display levels, particularly on such display levels that are perceived to be situated at different distances from the user and/or as being sloped. The presence of a completely 3D-enabled display device is therefore not necessary in order to represent to the user, for example, intuitively and clearly, different slopes of a virtual road level with respect to the horizon or to show that a represented object is farther away from the vehicle than another represented object. The invention can therefore be implemented, for example, by way of a head-up display or another display device which permits, for example, only 3 to 12 different depth representations.

In a further variant of the method according to the invention, a selection of the displayed first and/or second objects takes place based on a criterion according to which objects that have an increased risk of colliding with the vehicle are preferred as objects to be displayed. Thus, the objects to be represented in the display, particularly the invisible objects, can be selected as a function of their traffic relevance, particularly of the collision probability with the vehicle. In this case, the collision probability can be determined by use of methods known per se for the determination of possible collisions.

In a further development of the method according to the invention, the first and second objects represented on the display are connected by way of additional graphic elements. These artificially generated graphic elements particularly have the purpose of representing the special relationship between visible and invisible objects. The graphic elements may particularly be designed as subsidiary lines, raster graphics, dots, arrows, marked surfaces or distance indications.

Advantageously, in addition to the representation of an object, particularly of a second object, which is designed, for example, as a symbol or as a highlighted object, an enlarged representation of this object, for example, can be represented, for example, in another area of the display device or on a different display device.

In this manner, a relatively large view of the object as well as the position of the object can be represented simultaneously on a display surface that is relatively small as a whole, or within a small viewing angle. In a preferred further development of the method, the enlarged object view can be represented in a different perspective than the virtual road level shown in an embodiment of the invention, for example, in the untransformed perspective and/or with a changed appearance, for example, with highlighted edges and contours.

Advantageously, the method can be further developed such that additional graphic elements are displayed which display the relationship of the enlarged representation of the object to the position of the object on the display. The user is thereby informed of the association of the enlarged representation of the object with the object representation or the representation of the position of the object. The graphic elements can connect the representation of the object, which is further developed, for example, as a symbolic representation, with the enlarged representation or indicate the relationship between the two representations by the direction of a line which is essentially oriented from one representation to the other representation.

Advantageously, the part of the surroundings of the vehicle represented by the display device is a function of the presence of at least one second object, particularly of at least one traffic-relevant second object. Thus, the greater part of the available surface of the display can be utilized for representing a part of the surroundings in which a traffic-relevant object is recognized that is invisible or not directly visible to the occupant. This can contribute to a better concentration of the user on the second object and its position as well as to an improved utilization of the display surface.

In an embodiment of the invention, the display device is part of an external device outside the vehicle, for example, of a mobile telephone, in which case information is transmitted from the vehicle to the external device, particularly in a wireless manner. In this case, the user can preferably select the position of an occupant from whose perspective the surroundings of the vehicle are to be represented, by way of the external device, from at least two positions.

In addition to the above-described method, the invention also relates to a display device for representing objects of varying visibility surrounding the vehicle to a user from the perspective of an occupant, particularly of the driver, of the vehicle on the display of a display device, in which case the surroundings of the vehicle were at least partially recognized automatically by means of one or more object recognition devices. The display device includes a means by which, for objects that were recognized by the object recognition device or devices, it can be determined based on one or more criteria whether the respective object is a first object, which is classified as visible to the occupant, or a second object, which is classified as invisible to the occupant. The display device also includes a means by which, for a number of recognized objects comprising at least one first object and at least one second object, the respective positions of the objects can be determined for the display, in the case of which the geometrical relationships between the number of objects correspond essentially to the real geometrical relationships for the perspective of the occupant of the vehicle. The display device is further developed such that the number of objects are displayed in the determined positions on the display. By way of this display device, preferably each variant of the above-described method according to the invention can be implemented. The display device can be installed or integrated in one or more control devices or units of the vehicle.

In addition to the above-described display device, the invention also relates to a vehicle comprising such a display device.

Other objects, advantages and novel features of the present invention will become apparent from the following detailed description of one or more preferred embodiments when considered in conjunction with the accompanying drawings.

DETAILED DESCRIPTION OF THE DRAWINGS

FIGS. 1 and 2 were explained in detail above in the exposition of the problems on which the invention is based. Another description of these figures is not necessary here.

Figure 3:
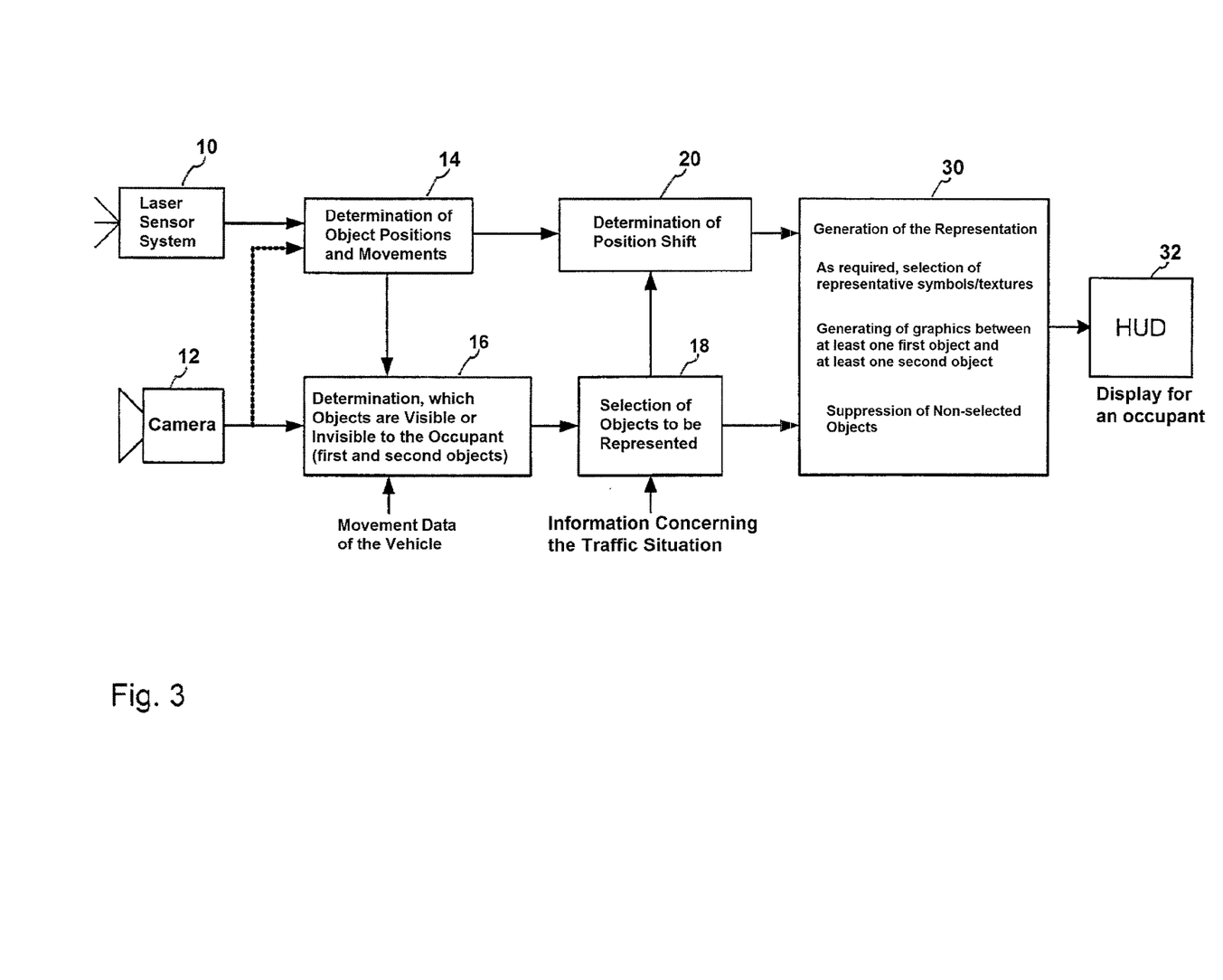
FIG. 3 is a schematic representation of an embodiment of the method according to the invention.

FIG. 3 is a schematic view of an example of an implementation of the invention. In this case, the vehicle surroundings are detected by a laser sensor system 10 as well as a camera 12. The positions of the objects and their movements in the detected surroundings are determined 14 from the data of the laser sensor system and the camera. Based on these positions and by including the data of the camera, according to one criterion or several criteria, it is then determined which objects are visible or invisible to the occupant. The visible objects are classified as first objects and the invisible objects are classified as second objects 16. Movement data of the vehicle may also be included in this determination. For example, the speed at which the vehicle is moving can influence the visibility of an object.

Subsequently, objects are selected that are to be represented on a display of the display device in the motor vehicle, the objects to be represented comprising at least one first and at least one second object 18. When selecting the objects to be represented, particularly information concerning the traffic situation can be taken into account. For example, preferably those second objects may be displayed for which there is an increased collision risk.

Subsequently, the determination of a position shift takes place, according to which it is determined in which position the objects to be represented are located for the perspective of the occupant of the vehicle 20. This position shift will be explained in greater detail by means of FIG. 4. Finally, based on the determined position shifting and the selected objects to be represented, a representation is generated on the display of the display device, symbols or textures representative of the displayed objects being used, as applicable 30. In this case, the representation contains connection graphics between at least one first object and at least one second object. Furthermore, non-selected objects are suppressed in the representation. In this case, the representation can be displayed to the driver on a head-up display (abbreviated HUD) 32 but, as required, may also be displayed on other display devices, such as displays, 3D displays, as a light projection or a holographic image.

In one embodiment, the road boundaries and road markings recognized by the camera are classified as visible objects and are also displayed in the display. In this case, a virtual road level is generated on the display which, for example, is defined based on lane positions determined by way of a lane recognition, and contains road boundaries and road markings. A representation is thereby generated which includes as visible objects at least the recognized road boundaries and road markings respectively at a virtual road level and which, in addition, contains at least one object that is not visible to the driver. The road boundaries and road markings respectively and the at least one invisible object are arranged in positions in which the geometrical relationships between the road boundaries and road markings respectively and the at least one invisible object correspond to the real geometrical relationships for the vehicle driver's perspective. In this manner, a falsification of the representation as a result of the shifted arrangement of the object-recognizing camera system will be compensated during the display, and the driver will rapidly recognize the context between the objects represented on the display and their positions in the real surroundings.

Figure 4:
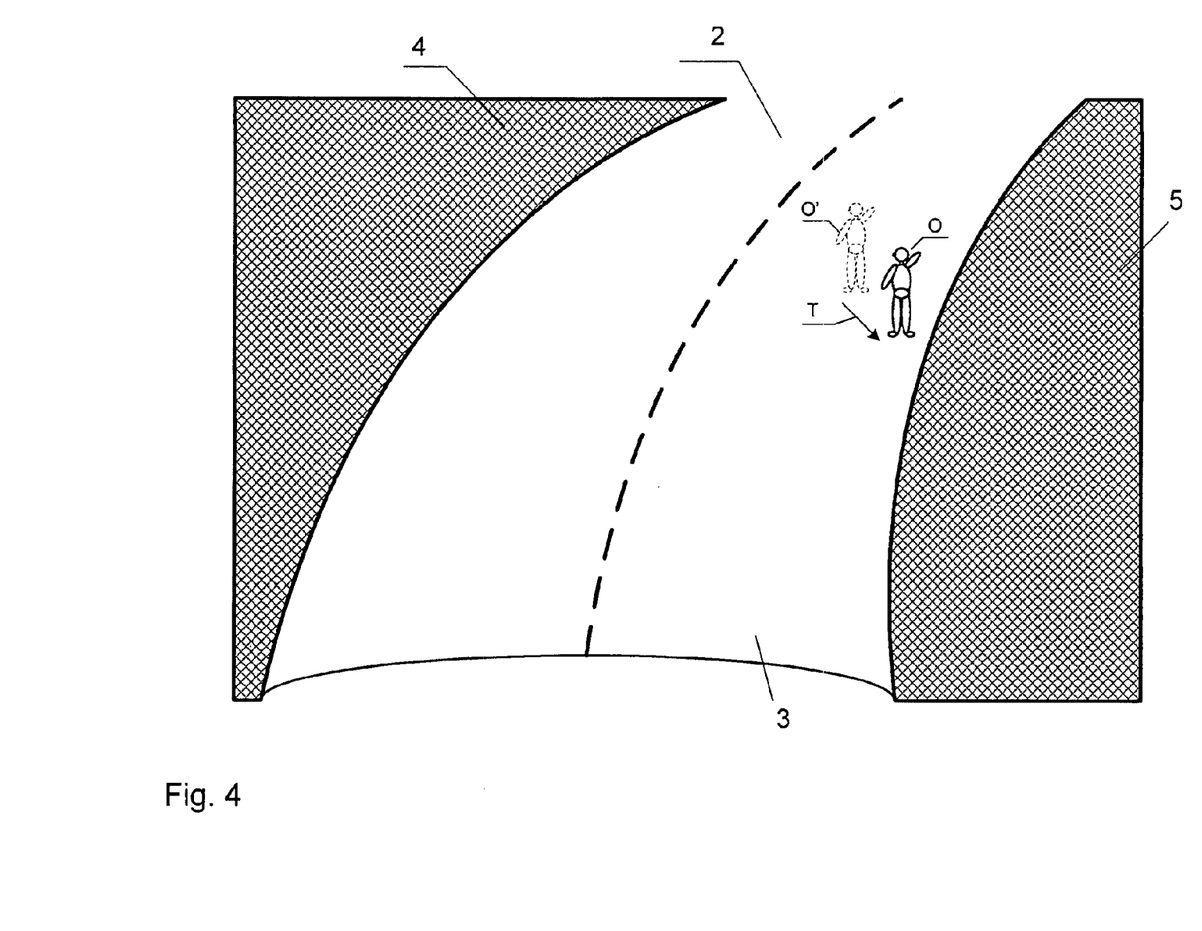
FIG. 4 is a view of an example of a representation of the vehicle surroundings generated by the method according to the invention.

FIG. 4 illustrates an example of a representation that can be generated by the method according to the invention. It is shown that the representation includes the virtual road level with two driving lanes 2 and 3, as well as areas 4 and 5 beside the driving lanes, as visible objects. In this case, the areas beside the driving lanes are implemented as corresponding textures in the display. By means of an object-recognizing system, an object O was detected in the form of a person who is situated on the road and was classified for the driver as not being visible, for example, because of the person's poorly reflecting clothing. The position of the object, as viewed from the installed position of the object-recognition system, is indicated by the object O' in FIG. 4, which is not a component of the generated representation. Based on the position of object O', the position is now determined in which the object would have to be viewed for the displayed proportions to be maintained with respect to the real scene as viewed from the driver's position. This corrected object position corresponds to the position of object O, which is part of the generated representation. In this case, the new object position is computed by means of a transformation indicated in FIG. 4 by a corresponding arrow T, which also is not a component of the representation.

The representation illustrated in FIG. 4 can particularly take place in the head-up display of the vehicle, and the recognized road boundaries and road markings respectively can be determined, for example, by means of a corresponding lane guidance assistance system. The represented object can be recognized, for example, based on data of various sensors or by a night vision system. In the representation, it is not the actually detected object that is displayed but a corresponding symbol for this object, so that the driver can very easily differentiate between the real surroundings and the virtual representation.

As indicated in the above descriptions, by use of one or more object recognition systems, not only the object recognition can be carried out but information for generating the representation can also be obtained. It can, for example, be determined from the available depth information how far a recognized obstacle is away from the vehicle. The offset is thereby determined by which the symbol for this obstacle to be displayed in the representation is to be shifted relative to the road boundaries and/or road markings. The determination of this offset is based on the knowledge of the geometrical relationships between the driver's position, the installation location of the device, which recognizes the driving lanes (for example, a monocular camera of a lane guidance assistance system), and the installation location of the device which supplies the depth information (for example, the 3D TOF sensor of a MIDIAS camera system or, as required, a corresponding radar/lidar sensor). The symbol for the obstacle is thereby indicated in the representation at a location relative to the displayed road markings and road boundaries respectively at which the real obstacle is situated relative to the real road markings. The driver thereby obtains information, which can be interpreted rapidly and easily, as to the location at which the real obstacle that is not visible under the present marginal conditions is located.

Figure 5:
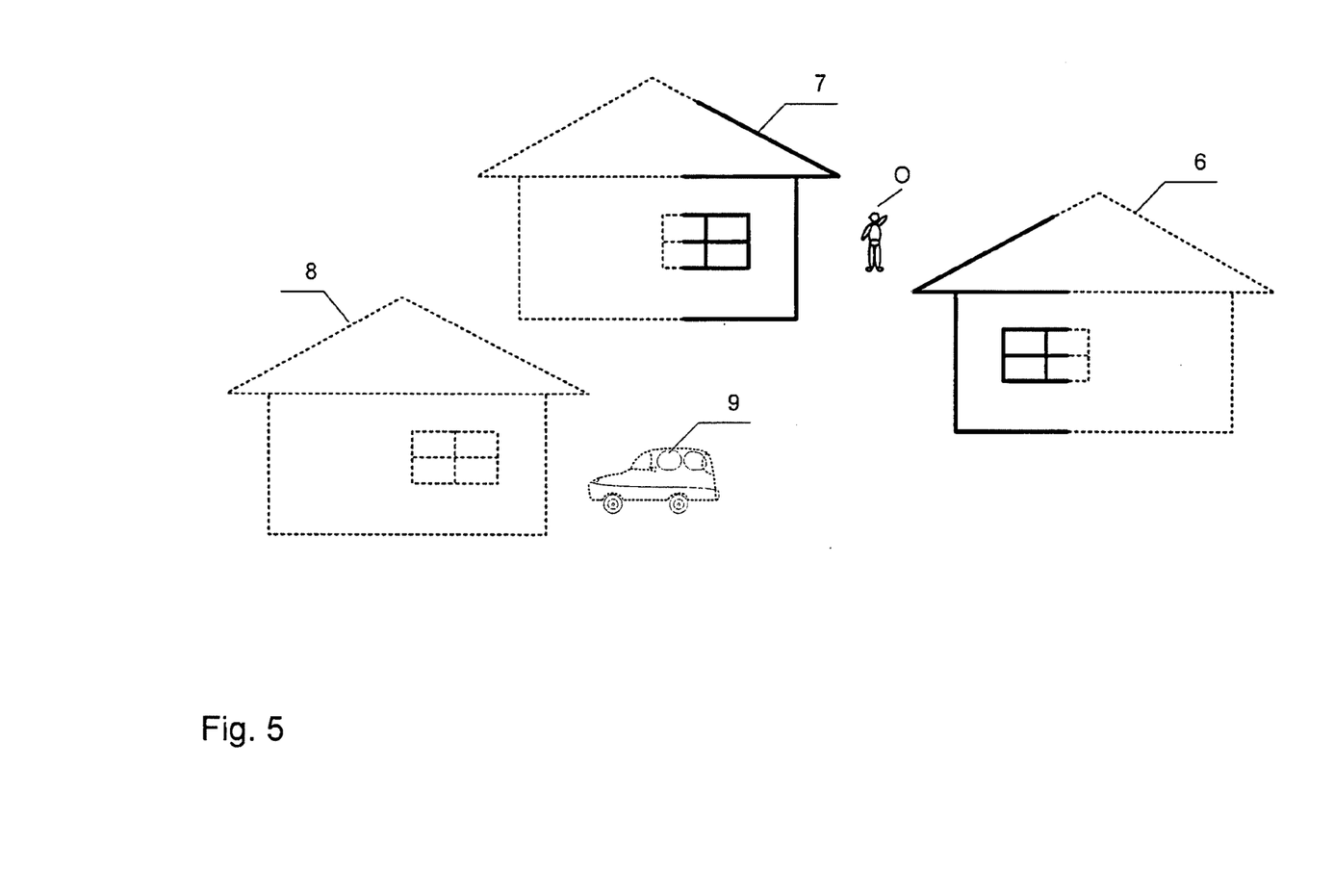
FIG. 5 is a view of an example of a further representation of the vehicle surroundings generated by the method according to the invention.

FIG. 5 illustrates a further example of a representation according to the invention of objects of varying visibility on the display of a display device of the vehicle. Surroundings are detected in this case which contain three houses 6, 7 and 8, a vehicle 9 as well as a person O as the objects. The person O is classified to be invisible and the remaining objects 6 to 9 are classified as visible. In the figure, the object edges represented on the display are drawn as solid lines, the object edges that are not displayed are drawn as dash-dotted lines. Only those objects (parts of the houses 6 and 7) directly visible to the driver, which are useful for describing the position of the invisible object O not directly visible to the occupant of the vehicle, are represented. The displayed first objects therefore form a frame that is used for a correct and intuitively understandable perception of the position of the second object O. The objects 8 and 9, which are visible to the occupant, do not appear on the display device of the vehicle or they are changed by lowering the contrast or the use of an image processing filter with respect to the displayed parts of objects 6 and 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for representing objects of varying visibility surrounding a vehicle for a user on a display of a display device from a perspective of an occupant, the surroundings of the vehicle being at least partially automatically recognizable by one or more object recognition devices installed in the vehicle, the method comprising the acts of:
   determining, based on one or more criteria, whether objects recognized by the one or more object recognition devices is a first object classified to be visible to the occupant or a second object classified to be invisible to the occupant;
   determining respective positions for a number of recognized objects, the number of recognized objects comprising at least one first object and at least one second object, wherein the respective positions of the number of objects for the display have geometrical relationships between the number of objects corresponding substantially to real geometrical relationships from the perspective of the occupant by virtue of being shifted from a perspective of the one or more object recognition devices to the perspective of the occupant; and
   displaying, on the display of the display device, the number of recognized objects in corresponding respective positions on the display.

2. The method according to claim 1, wherein, if with respect to an object, a first threshold of a visibility proportion is exceeded for the occupant of the vehicle, then the object is classified as a first object; and
   wherein, if with respect to the object, the visibility proportion falls below a second threshold for the occupant of the vehicle, then the object is classified as a second object, the second threshold corresponding to or being lower than the first threshold.

3. The method according to claim 1, wherein differentiation between the first and the second objects takes place using two types of sensors and/or object recognition devices.

4. The method according to claim 1, wherein the user is the occupant of the vehicle, the method further comprising the acts of:
   detecting a viewing direction of the occupant of the vehicle; and
   defining second objects based on the one or more criteria as those objects which, based on the detected viewing direction and/or saccadic eye movements, have a high probability of being overlooked by the occupant of the vehicle.

5. The method according to claim 4, wherein the viewing direction comprises a history of detected viewing directions.

6. The method according to claim 1, wherein a position of the display of the display device perceptible to the user of the vehicle is arranged outside an interior of the vehicle.

7. The method according to claim 1, wherein the act of representing the number of objects occurs by displaying the first and second objects at least partially as symbols on the display.

8. The method according to claim 1, wherein at least one of road boundaries and road markings recognized by the one or more object recognition devices up to a predefined distance from the vehicle are classified as first objects.

9. The method according to claim 1, wherein the classification of the number of objects as first or second objects occurs as a function of at least one of light and visibility relationships detected by at least one detection device.

10. The method according to claim 9, wherein the at least one of the light and visibility relationships comprise a history of the at least one of the light and visibility relationships, and
    further wherein the detecting of the at least one of the light and visibility relationships factors into account psychovisual properties of a human vision system.

11. The method according to claim 1, wherein differentiation between the first and the second objects takes place by way of a simulation of a visual system of the occupant of the vehicle.

12. The method according to claim 1, wherein the act of representing the number of objects on the display further comprises the act of representing only the first visible objects that surround the second objects represented on the display at least on two or three spatial sides.

13. The method according to claim 2, wherein portions of first objects representable in a determined position on the display are at least one of not represented and suppressed in the representation on the display when a visibility proportion of said object falls below the second threshold.

14. The method according to claim 1, further comprising the act of generating on the display a virtual road level comprising at least one of road boundaries and road markings recognized by at least one of the one or more object recognition devices.

15. The method according to claim 1, further comprising the act of selecting the first and the second objects for display on the display as a function of at least one of odometric data of the vehicle and an automatically analyzed traffic situation.

16. The method according to claim 1, further comprising the act of determining the respective positions of the first and the second objects for the display using depth information about the real position of the first and the second objects relative to the vehicle, said depth information being determined by at least one of the one or more object recognition devices.

17. The method according to claim 16, wherein the display for generating a depth effect has several display levels with different positions perceivable by the user with respect to a predefined viewing direction of the user.

18. The method according to claim 17, wherein portions of the representation of different objects are represented on the several display levels.

19. The method according to claim 18, wherein the several display levels are perceived to be situated at at least one of different distances from the user and as being sloped.

20. The method according to claim 1, wherein selecting of displayed first and/or second objects occurs based on criteria by which objects having an increased collision risk with the vehicle are preferred as objects to be displayed.

21. The method according to claim 1, wherein in addition to the representation of the number of objects, an enlarged representation of a same object is displayed on the display, said enlarged representation differing from the representation on the display.

22. The method according to claim 21, wherein the enlarged representation differs from the representation on the display as a result of at least one of a perspective of the object and image parameters used for the object.

23. The method according to claim 21, wherein additional graphic elements are displayed, the additional graphic elements indicating a relationship of the enlarged representation to a position of the object on the representation.

24. The method according to claim 1, wherein the surroundings of the vehicle to be represented on the display depends upon a presence of at least one second object that is traffic-relevant.

25. The method according to claim 1, wherein the represented number of objects on the display are connected using additional graphic elements.

26. The method according to claim 1, wherein the display device is part of an external device outside the vehicle, and further wherein information is transmitted from the vehicle wirelessly to the external device.

27. The method according to claim 26, wherein a position of an occupant from whose perspective the surroundings of the vehicle are to be represented is selectable by the user from at least two positions using an external device.

28. A display device for representing objects of varying visibility surrounding a vehicle for a user from a perspective of an occupant, wherein the surroundings of the vehicle are at least partially automatically recognizable by one or more object recognition devices, the display device comprising:
a display;
means for determining, based on one or more criteria, whether objects recognized by the one or more object recognition devices is a first object classified to be visible to the occupant or a second object classified to be invisible to the occupant; and
means for determining respective positions for a number of recognized objects for the display, the number of recognized objects comprising at least one first object and at least one second object, wherein the respective positions of the number of objects for the display have geometrical relationships between the number of objects corresponding substantially to real geometrical relationships from the perspective of the occupant by virtue of being shifted from a perspective of the one or more object recognition devices to the perspective of the occupant.

29. A vehicle, comprising:
one or more object recognition devices;
a display device;
a display for representing objects of varying visibility surrounding the vehicle for a user from a perspective of an occupant, wherein the surroundings of the vehicle are at least partially automatically recognizable by the one or more object recognition devices;
means for determining, based on one or more criteria, whether objects recognized by the one or more object recognition devices is a first object classified to be visible to the occupant or a second object classified to be invisible to the occupant; and
means for determining respective positions for a number of recognized objects for the display, the number of recognized objects comprising at least one first object and at least one second object, wherein the respective positions of the number of objects for the display have geometrical relationships between the number of objects corresponding substantially to real geometrical relationships from the perspective of the occupant by virtue of being shifted from a perspective of the one or more object recognition devices to the perspective of the occupant.

* * * * *